Patented Jan. 7, 1936

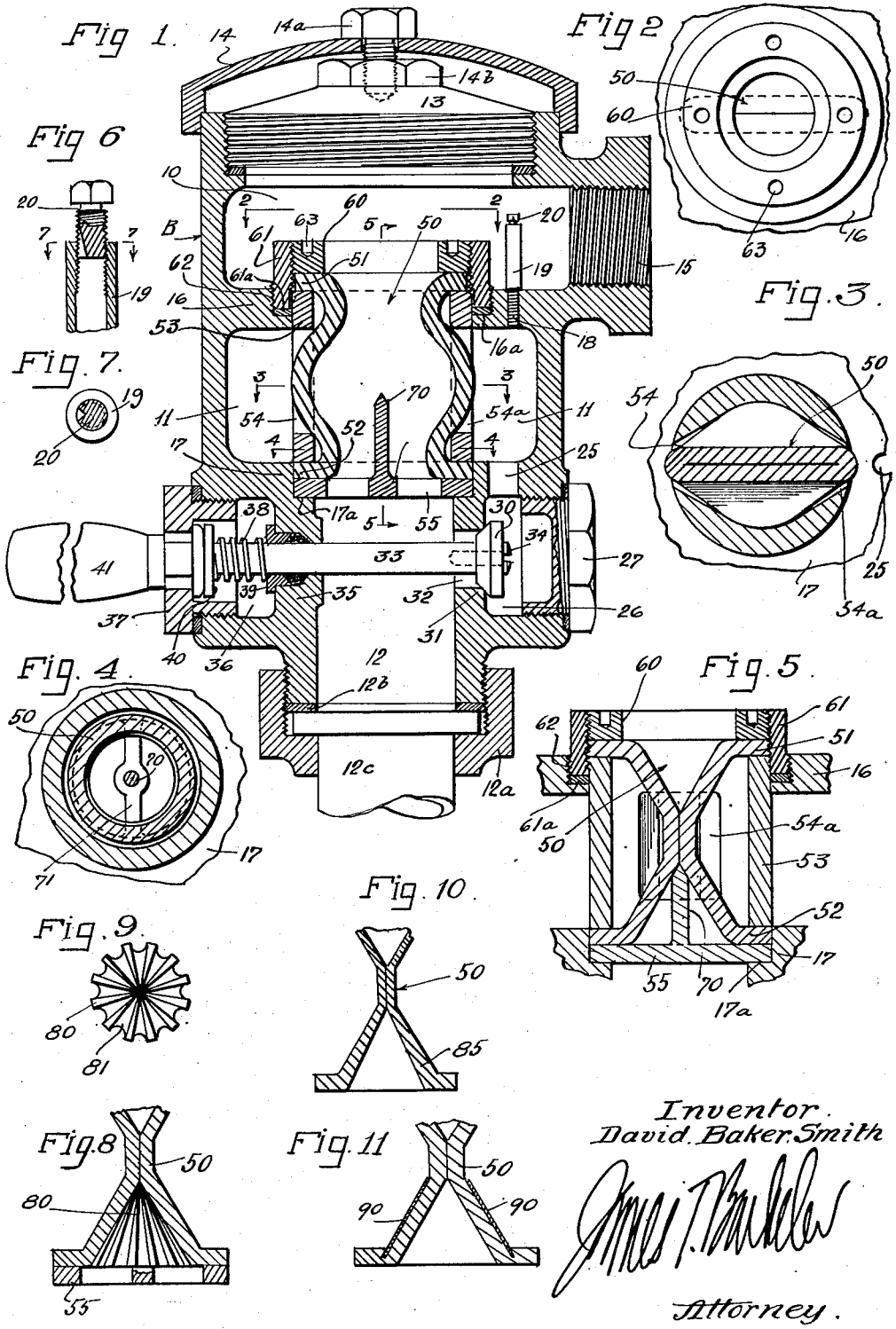

2,026,916

UNITED STATES PATENT OFFICE 2,026,916

VALVE

David Baker Smith, Los Angeles, Calif.

Application February 5, 1932, Serial No. 591,067

9 Claims. (Cl. 137—139)

My invention has to do with valves, such as are characterized by their ability, when manually opened, to remain open a predetermined length of time, and then to automatically close. More specifically, my invention relates to such valves as are commonly called "flush valves."

In most flush valves now known to the art the flushing water is controlled by a valve member seating against a seat and the length of time such valve remains open is usually controlled by a dashpot or similar arrangement. Such valves are, in many ways, unreliable and unsatisfactory for the reason that solid matter carried in suspension in the flushing water often lodges on the valve seat, thus preventing a complete closing action; and the restricted passages in the dashpot device become clogged with such solids, which interferes with dependable operation. Also such valves often close with an objectionable sound.

It is an object of my invention to overcome these objectionable features, which I accomplish by providing a valve in the form of a flexible tube adapted to be opened by pressure in the main fluid line and closed and held closed by pressure within a surrounding chamber in the valve body. When my valve is closed, the flexible tube walls collapse so that their inner surfaces bear against each other. Thus if any solid matter should lodge against the inner tube wall, it will not affect the closing action since the flexibility of the tube permits of closing around the solid.

A further object is to eliminate vibration and objectionable sounds such as usually attend flush valve operation. Also my device may be economically manufactured and assembled since very little machining of parts is necessary.

These and other objects and accomplishments will become obvious from the following detailed description of a particular adaptation, for which purpose I shall refer to the accompanying drawing, in which:

Fig. 1 is a medial sectional view of my device, the valve being shown in closed position;

Figs. 2, 3, 4, and 5 are sections on lines 2—2, 3—3, 4—4, and 5—5 of Fig. 1, respectively;

Fig. 6 is a medial sectional view of the by-pass tube;

Fig. 7 is a section on line 7—7 of Fig. 6; and

Figs. 8, 9, 10, and 11 illustrate modifications of my invention.

Referring to the drawing, B designates the body, which has an inlet chamber 10, an annular lower chamber, said chambers being formed as hereinafter described, an outlet passage 12, a top closure plug 13, a cap 14 and an inlet 15 connected to the fluid supply line. Annular inwardly projecting body portion 16 forms the bottom closure for inlet chamber 10 and the top closure for annular chamber 11, and annular inwardly projecting body portion 17 forms the bottom closure for chamber 11; annular shoulders 16a and 17a being presented by body portions 16 and 17, respectively, for the purposes to be described.

A restricted by-pass 18 is provided through member 16 for communication between inlet chamber 10 and chamber 11. Tube 19 is screwthreaded into opening 18 and projects upwardly into chamber 10, a valve 20, in the form of a screw having a tapered slot and adapted to be screwed in and out of tube 19, forming a control for the by-pass. Restricted opening 25 through body portion 17 communicates between chamber 11 and a valve chamber 26. For convenience of assembly and to provide access to the valve element, chamber 26 is closed by a plug 27 screwthreaded into body B. For releasing fluid from chamber 11, and consequently releasing pressure therein, I provide a cone-shaped valve member 30 which seats against body wall 31 around opening 32 communicating between chamber 26 and outlet 12. Valve member 30 is mounted on plunger 33 by means of screw 34. Plunger 33 extends, by a loose fit, through opening 32, across outlet 12, through opposite body wall 35 into a chamber 36 which is closed by plug 37. A coil spring 38, surrounding the plunger and seating at one end against packing washer 39 and at its other end against a shoulder 40 on the plunger end, urges the valve into closed position. This valve member is manually opened by operating lever 41, which forces the plunger inwardly to move valve 30 off its seat.

Body cap 14 is held in position on the body by a screw 14a threaded into closure plug 13 and spacer nut 14b.

For controlling the main passage of fluid under pressure between inlet chamber 10 and outlet 12, I provide a tube 50 composed of some resilient material such as rubber and which is normally collapsed. This tube extends from inlet chamber 10 to outlet 12, its top end forming an annular flange 51 and its bottom end forming annular flange 52. The tube is mounted longitudinally within a sleeve 53, which sleeve is slotted at 54, 54a for the purpose to be hereinafter described, said sleeve slots communicating with chamber 11. Tube flange 52 is clamped and held in position between a ring 55, which rests on shoulder 17a, and the lower end of sleeve 53; and tube flange 51 is clamped between the top end of sleeve 53 and a sleeve 60, which latter sleeve is screw-threaded into another sleeve 61 which in turn is screw-threadedly mounted in body portion 10 as shown at 62. A packing washer 61a, between sleeve 61 and shoulder 10a, provides a fluid tight fit of sleeve 61 against shoulder 10a. Holes 63, four in number, in the top end of sleeve 60 facilitate removal and replacement of the sleeve by a spanner wrench.

While flanged tube ends 51 and 52 are at all times held stationary in round shape by the clamping means described, when the valve is closed and the inner surfaces of the tube thus collapsed against each other, the movable portion of the tube intermediate its ends, and particularly that portion at and adjacent the central intermediate portion, is flat, as best shown in Figs. 2 and 3, the ends of the flat portion projecting through slots 54, 54a as shown in Fig. 3. Sleeve-slots 54, 54a are, in effect, undercut, as shown, so that pressure from chamber 11 is directed tangentially around the tube-walls. This undercutting also facilitates or forms a guideway for the projection of the flattened tube portion through the slots when the tube-walls are collapsed, thus preventing wrinkling of the collapsed tube, as would otherwise occur. This collapsing is aided or made uniform by virtue of the fact that the tube is molded in a flattened shape or substantially oval in cross-section and thus the tube resiliency tends to give uniformity to the collapsing action. When pressure within chamber 11 is relieved, however, the fluid under pressure passing through the tube from the inlet radially distends the tube walls towards the inner walls of sleeve 53 into a substantially round shape.

From the foregoing description, it will be observed that when valve 30 is closed, annular chamber 11 is filled through by-pass 19 and, a relatively greater tube surface being presented within chamber 11, the pressure within the chamber forces the tube walls together, against the pressure within the tube, to stop the passage of fluid through the tube interior from inlet chamber 10 to outlet 12. When valve 30 is unseated sufficiently to partially drain chamber 11, the pressure within that chamber is relieved and the tubular valve 50 will remain open or distended until chamber 11 is again filled.

Outlet 12 is provided with a suitable collar 12a for connection with the pipe leading to the flushbowl, not shown; a packing washer 12b forming fluid tight connection between outlet pipe 12 and the flanged end 12c of said pipe.

During closure of valve tube 50, there being greater pressure on the inlet end than on the outlet end, I have found that there is a tendency of the tube to sag towards its lower or outlet end, causing an uneven closing action and consequently setting up a certain amount of vibration. I compensate for this unequal pressure distribution and eliminate vibration by providing a support or reinforcement for the lower end of the flexible tube, which functions to resist or delay closure or collapsing of the tube at and adjacent its lower end. I prefer to accomplish this by employing a pin 70, mounted on a bridge 71, which bridge is carried by ring 55. This pin projects upwardly into the outlet end of tube 50 and acts to resist or delay closure of the bottom portion of the tube until closing action sets in at or near the center of the tube or the portion of the tube immediately above the projecting end of the pin.

While I illustrate this particular expedient as being preferable, I wish it understood that satisfactory results obviously may be accomplished by other means, such, for instance, as a fluted cone-shaped projection in lieu of the pin 70, by forming the tube walls at and adjacent its bottom end thicker and less flexible than at the top end, or by applying a reinforcing exterior covering around the lower end of the tube—such modifications being shown in Figs. 8, 9, 10, and 11.

In Figs. 8 and 9 I show, in lieu of the pin means 70 before described, a cone 80 fluted as at 81. In this modification, the inner tube walls adjacent the lower end of the tube collapse against the cone member when the valve is in closed position.

While it will be understood that the end of eliminating the sagging of the tube-walls toward the discharge end and the consequent vibration resulting from such unequal collapse, may be accomplished by reinforcing the entire movable portion of the tube-walls or making them of a flexible material sufficiently thick or strong as to withstand the unequal pressure distribution, and such provision comes within the scope of the invention in its broader aspects, I find that the reinforcing or thickening of one end only seems to amply check such vibration and sagging. For instance such provision is shown in Figs. 10 and 11 now to be described.

In Fig. 10 I show, as the reinforcing means, a thicker and less resilient end portion 85 of tube 50. Here, the lower end portion of the tube being relatively less flexible than the top portion, a certain amount of resistance to closure of the tube at its lower end portion is effected.

In Fig. 11 the tube is shown as having an exterior covering 90, which covering may be of any suitable flexible material, but preferably being of a less flexible characteristic than the material of which the tube proper is composed.

While, for the purpose of giving a clear understanding of my invention, I have resorted to specific structural details, I wish it understood that my invention, in its broader aspects, is not confined to such details. Rather I wish it to be limited only as appears in the appended claims.

I claim:

1. A valve comprising: an inlet and an outlet, a flexible tube through which said inlet and outlet are communicable with each other, the walls of said tube being normally collapsed against each other intermediate its ends to prevent flow of fluid therethrough, means for distending the walls of said tube to establish communication between the inlet and outlet, and a pin member mounted independently of the tube and extending into the outlet end of the tube to delay collapsing of the tube walls from the direction of the discharge end.

2. A valve comprising: a body having an inlet and an outlet, a flexible tube forming a passageway between the inlet and outlet, a substantial portion of said passageway intermediate its ends being unobstructed so that the tube walls along said unobstructed area may collapse against each other to close the passageway, pressure applying means to distend the tube walls for opening the passageway, pressure applying means to collapse the tube walls against each other along the unobstructed passageway area to close said passageway, means for relieving said last mentioned pressure for a predetermined period, and a member mounted independently of the tube and extending into the outlet end thereof to resist collapsing of the tube walls from the direction of the said outlet end.

3. In a valve having an inlet and an outlet, a flexible tube adapted to pass fluid under pressure from said inlet to said outlet, said tube having a portion of which the opposite walls are movable into distended position by the fluid pressure within the tube and, by application of external pressure, movable to collapse on each other against said fluid pressure within the tube, means for applying and releasing said external pressure, and a sleeve surrounding said tube, which sleeve has longitudinal and undercut slots through which slots said last-named pressure is communicable with the tube exterior.

4. In a valve having an inlet and an outlet, a flexible tube adapted to pass fluid under pressure from said inlet to said outlet, said tube having a portion of which the opposite walls are movable into distended position by the fluid pressure within the tube and, by application of external pressure, movable to collapse on each other against said fluid pressure within the tube, means for applying and releasing said external pressure, means associated with the movable tube-walls to resist collapse thereof adjacent said outlet, and a sleeve surrounding said tube, which sleeve has longitudinal and undercut slots through which said last-named pressure is communicable with the tube exterior.

5. In a flush-valve having an inlet and an outlet communicable through a collapsible flexible tube, a rigid tubular member surrounding said flexible tube and having diametrically opposed longitudinally extending and undercut slots through the walls thereof through which slots a portion of the tube wall projects when the tube is in collapsed condition.

6. In a flush valve having an inlet and an outlet, a flexible tube through which said inlet and outlet are communicable and which communication is adapted to be opened and closed by distension and collapse of the tube-walls, said collapsible tube-walls being pre-formed in a shape substantially oval in transverse cross-section, and a sleeve surrounding said tube, said sleeve having diametrically opposed, longitudinally extending and undercut slots through the walls thereof through which slots a portion of the tube wall projects when the tube is in collapsed condition.

7. In a flush valve, a body having an inlet and an outlet, a flexible tube adapted to pass fluid introduced under pressure at the inlet to the outlet, the end portions of said tube having external attachment flanges, a sleeve surrounding the tube, said attachment flanges being clamped between the sleeve-ends and the body to hold the tube-walls spread open at their ends, the opposite tube-walls at a point intermediate said ends being movable into distended position by the fluid pressure within the tube and, by virtue of externally applied pressure, movable to collapse on each other against the resistance of said fluid pressure within the tube, said collapse-resistance being greater adjacent the inlet than it is adjacent the outlet, said collapsible tube-portion being pre-formed in a shape substantially oval in cross-section, said sleeve having longitudinal slots through which said external pressure is communicable with the tube, means for applying and releasing said external pressure, and means associated with and supporting the movable tube-wall portion to compensate for said unequal collapse-resistance.

8. A valve comprising: a body having an inlet and an outlet, a flexible tube forming a passageway between said inlet and outlet, the walls of said tube being normally collapsed against each other intermediate its ends, a sleeve surrounding said tube, said sleeve having longitudinal slots adapted to pass a portion of said tube when said tube is collapsed, means for applying pressure through said slots to collapse the tube and means for releasing said pressure.

9. A valve comprising: a body having an inlet and an outlet, a flexible tube forming a passageway between said inlet and outlet, the walls of said tube being normally collapsed against each other intermediate its ends, a sleeve surrounding said tube, said sleeve having diametrically opposed longitudinal slots through which a portion of said tube wall projects when said tube is collapsed, said sleeve and a portion of the body wall forming an annular pressure chamber the pressure from which is communicable to the tube exterior through said sleeve slots, pressure means for distending said tube walls to open the passageway, means for applying pressure to said chamber and tube exterior to collapse the tube walls against said tube-wall distending pressure and means for releasing said chamber pressure.

DAVID BAKER SMITH.